US012629803B2

(12) United States Patent
Fakher et al.

(10) Patent No.: US 12,629,803 B2
(45) Date of Patent: May 19, 2026

(54) BIT HOLDER FOR A MAGNETISABLE SCREWDRIVER BIT, DEVICE FOR THE AUTOMATED MANUFACTURE OF SCREW CONNECTIONS AND PROCEDURE FOR THE OPERATION OF A DEVICE FOR THE AUTOMATED MANUFACTURE OF SCREW CONNECTIONS

(71) Applicant: Hella GmbH & Co. KGaA, Lippstadt (DE)

(72) Inventors: Shahriar Fakher, Lippstadt (DE); Frank Jagow, Erwitte/Bad Westernkotten (DE); Miguel Lebrato-Rastrojo, Paderborn (DE); Thomas Albert Röbbecke, Erwitte (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 268 days.

(21) Appl. No.: 18/465,106

(22) Filed: Sep. 11, 2023

(65) Prior Publication Data

US 2024/0082998 A1 Mar. 14, 2024

(30) Foreign Application Priority Data

Sep. 12, 2022 (DE) ......................... 102022123132.1

(51) Int. Cl.
*B25B 23/12* (2006.01)
*H01F 7/20* (2006.01)

(52) U.S. Cl.
CPC ............ *B25B 23/12* (2013.01); *H01F 7/206* (2013.01)

(58) Field of Classification Search
None
See application file for complete search history.

(56) References Cited

U.S. PATENT DOCUMENTS

2004/0051610 A1 3/2004 Sajan

FOREIGN PATENT DOCUMENTS

| | | | | |
|---|---|---|---|---|
| CN | 118417935 A * | 8/2024 | .......... | B23Q 11/069 |
| DE | 102005063187 A1 * | 7/2007 | ............ | B25B 23/12 |
| DE | 102018210314 A1 | 1/2020 | | |
| DE | 112019000671 T5 | 11/2020 | | |
| DE | 102020126189 A1 | 4/2022 | | |

OTHER PUBLICATIONS

Machine translation of DE-102005063187A1 (Year: 2007).*

* cited by examiner

*Primary Examiner* — Bernard Rojas
(74) *Attorney, Agent, or Firm* — Husch Blackwell LLP

(57) ABSTRACT

A device is provided for the automated manufacture of screw connections. A jointed arm robot has an output element and an end link. The output element is arranged on the end link so as to be rotatable around an effector axis (wE). A screwdriving tool is rotatable around the effector axis (wE) by the output element. The device features at least one transmission operatively connected to the output element and the screwdriving tool, and transmits a speed between the output element and the screwdriving tool.

6 Claims, 2 Drawing Sheets

BIT HOLDER FOR A MAGNETISABLE SCREWDRIVER BIT, DEVICE FOR THE AUTOMATED MANUFACTURE OF SCREW CONNECTIONS AND PROCEDURE FOR THE OPERATION OF A DEVICE FOR THE AUTOMATED MANUFACTURE OF SCREW CONNECTIONS

CROSS REFERENCE

This application claims priority to German Application No. 10 2022 123132.1, filed Sep. 12, 2022, the entirety of which is hereby incorporated by reference.

FIELD OF THE INVENTION

The present invention relates to a bit holder for a magnetisable screwdriver bit and an associated device for the automated manufacture of screw connections. Furthermore, the invention relates to procedure for operating such a device.

BACKGROUND OF THE INVENTION

In industrial production, screw connections are manufactured predominantly by means of automated processes. The devices employed for this purpose are based in particular on jointed arm robots with processing heads in the form of automatic screwing devices. In addition, DE 10 2020 126 189 A1 discloses an approach in which the output element at the end link of a jointed arm robot is used for driving a screwdriving tool. Commonly used screwdriving tools include an exchangeable screwdriver blade, what is known as a screwdriver bit, which is accommodated on a bit holder in a torque-proof manner, wherein the bit holder is rotatable by means of a drive. In many cases, screwdriver bits are fashioned from a magnetisable material, such as a ferritic steel, and are magnetised by means of a permanent magnet that is either integrated or arranged on the bit holder. The use of magnetisable screws then gives rise to a retaining force between the magnetised screwdriver bit and a screw accommodated on the same, which makes it more difficult for the screw to become detached unintentionally from the screwdriver bit during the process of automated manufacturing of a screw connection. One disadvantage of using such magnetised screwdriver bits is contamination from adhering metal chips that are formed from abrasion of the screw heads, particularly when inserting the screwdriver bit into the screw head drive. After a number of screw connections have been manufactured, contamination of the screwdriver bit becomes critical, which can have a negative impact on the quality of the screw connections and constitutes a potential source of contamination of the workpieces to be screwed together. Cleaning of the screwdriver of adhering metal chips involves an elaborate process as they feature a strong adhesion due to the magnetic interaction.

BRIEF SUMMARY OF THE INVENTION

The task of the present invention is to propose a refinement of a device and a procedure for the automated manufacture of screw connections, wherein in particular the aforementioned problem of contamination formed during operation due to metal chips adhering to the screwdriver bit is to be solved.

This invention includes the technical teaching that the bit holder features an electromagnet for magnetising the screwdriver bit.

The fundamental concept of the invention thus consists of substituting the permanent magnet for magnetising the screwdriver bit customary in the state of the art with a controllable electromagnet. The controllability of the electromagnet makes it possible to set the magnetisation of the screwdriver bit in a purposeful manner, in particular the screwdriver bit can thus also be demagnetised, i.e. put into a state in which no macroscopic magnetic polarisation is present. This creates a possibility of influencing the magnetic interaction with adhering metal chips and in particular to make cleaning easier.

For example, the inventive bit holder features a hollow shaft with a bit receptacle at the end for fastening the screwdriver bit preferentially in such a way that it can be detached wherein the electromagnet is arranged inside the hollow shaft behind the bit receptacle. The screwdriver bit can be accommodated in the bit receptacle in such a way that it extends along the longitudinal axis of the hollow shaft and the main direction of flow of the magnetic flow that can be generated by the electromagnet likewise corresponds to the longitudinal axis of the hollow shaft. For example, the electromagnet features a toroidal coil, the coil axis of which corresponds to the longitudinal axis of the hollow shaft. To ensure an effective magnetisation of the screwdriver bit, the distance between the electromagnet and the screwdriver bit is preferentially minimal. In this respect, the process of magnetising the screwdriver bit should not, if possible, be impaired by the bit receptacle, for which purpose the bit receptacle features, for example, an aperture around the longitudinal axis of the hollow shaft or is likewise fashioned from a magnetisable material. The hollow shaft of the bit holder is preferentially fashioned from a non-magnetisable material, for example from high-alloy stainless steel.

In an advantageous embodiment of the inventive bit holder, the electromagnet features an anchor, wherein the bit receptacle and/or the screwdriver bit can be made to vibrate. This is in particular intended to make it possible to free the screwdriver bit from adhering metal chips by means of vibrations. In addition, a process of magnetisation can be purposefully influenced by means of simultaneous vibration inducement. For example, the anchor can be shifted along the longitudinal axis of the bit holder, and when applying an alternating voltage to the electromagnet, the anchor performs an oscillation in the course of which the anchor taps against the back of the bit receptacle or the screwdriver bit.

In an alternative embodiment, the bit holder features a separate vibration inducer by means the which the bit receptacle and/or the screwdriver bit can be made to vibrate. This separate vibration inducer can, for example, be fashioned as a further electromagnet with an anchor or as an unbalance motor or as an piezoelectric actor.

The invention furthermore relates to a device for the automated manufacture of screw connections comprising a jointed arm robot with an output element rotatable around an effector axis, wherein the device comprises an inventive bit holder according to one of the aforementioned embodiments, wherein the bit holder is accommodated at least indirectly on the output element and is rotatable around the effector axis by means of the output element. The operating voltage for the electromagnet of the bit holder is preferentially provided by means of the energy supply of the jointed arm robot. For example, it is possible for a planetary gear for purposeful speed transmission to be arranged between the output element of the jointed arm robot and the bit holder, on the output of which planetary gear the bit holder is accommodated in a torque-proof manner.

Furthermore, the invention relates to a procedure for operating an inventive device for the automated manufacture of screw connections, at least comprising the following procedural steps: arrangement of a magnetisable screwdriver bit on the bit holder, magnetisation of the screwdriver bit by means of the electromagnet, accommodation of a magnetisable screw on the screwdriver bit, and manufacture of a screw connection by means of the screw.

During magnetisation, the electromagnet is typically excited by means of a direct-current voltage. The magnetic flow generated in doing so is concentrated on the longitudinal axis of the bit holder and leads to the setting of a preferred macroscopic orientation of the magnetisation of the screwdriver bit. In particular, the electromagnet can remain excited over the course of the following procedural steps in order to keep the magnetisation of the screwdriver bit constant. A screwdriver bit magnetised in such a way exercises an attractive interaction on screws made of a magnetisable material so that secure handling of such screws by means of the inventive device is ensured.

Preferentially, the screwdriver bit is cleaned of adhering metal chips after the manufacture of a number of screw connections, wherein the screwdriver bit and/or the metal chips are demagnetised by means of the electromagnet. During demagnetisation, the preferred macroscopic orientation of the magnetisation of the screwdriver bit and the metal chips is eliminated, so that the adhesive force based on magnetic interaction between the metal chips and the screwdriver bit is reduced significantly. For demagnetisation, it is purposeful for the polarity of the electromagnet to be reversed. In its demagnetised state, the screwdriver bit can be cleaned of metal chips using simple means, for example by means of the airflow of a vacuum cleaner. According to the invention, elaborate mechanical cleaning is thus no longer necessary as is the case with permanently magnetised screwdriver bits in devices from the state of the art.

As a further advantage, the screwdriver bit is made to vibrate by means of the anchor of the electromagnet or by means of the vibration inducer during demagnetisation and/or following demagnetisation. The demagnetisation process can be accelerated through simultaneous vibration inducement, and in particular the vibrations of the screwdriver bit assist in detaching the adhering metal chips.

The described cleaning process, i.e. the demagnetisation of the screwdriver bit and/or the vibration inducement of the screwdriver bit is preferentially performed within the effective range of a vacuum cleaner.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1A:
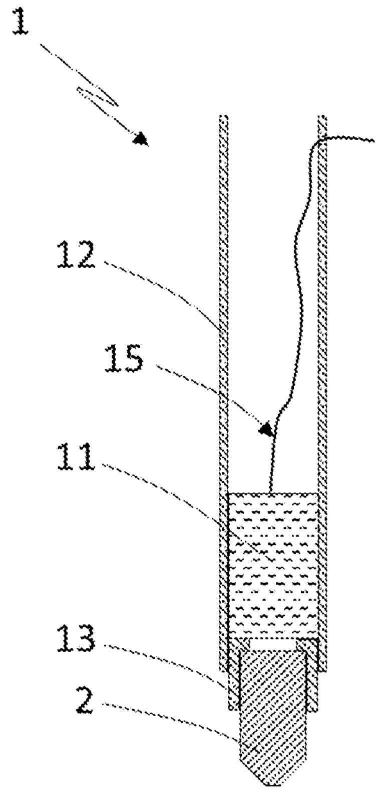
FIG. 1*a* is a schematic cross-section view of a first sample embodiment of the inventive bit holder.
Figure 1B:
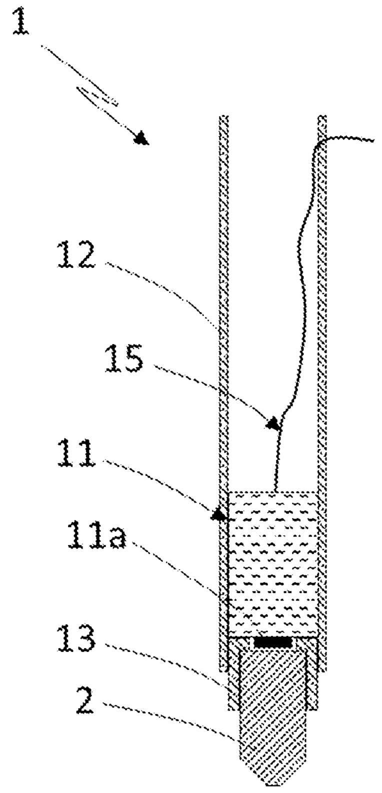
FIG. 1*b* is a schematic cross-section view of a second sample embodiment.
Figure 1C:
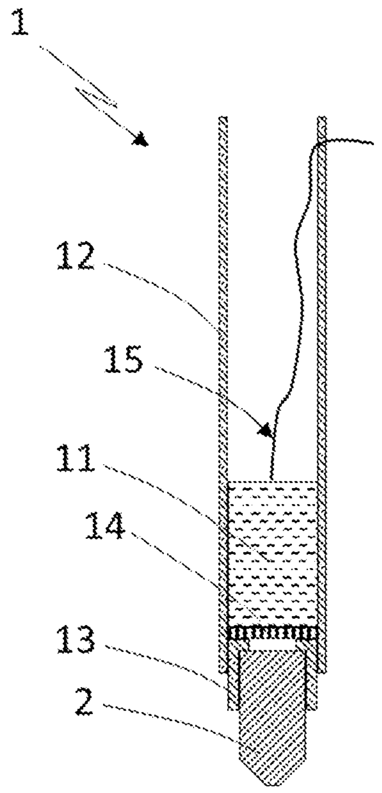
FIG. 1*c* is a schematic cross-section view of a third sample embodiment.

FIGS. 1*a* through 1*c* show schematic cross-section views of three sample embodiments of the inventive bit holder 1 for a magnetisable screwdriver bit 2, wherein the bit holder 1 features in each case the hollow shaft 12 with the bit receptacle at the end 13 for fastening the screwdriver bit 2 preferentially in a detachable manner, as well as the electromagnet 11, which is arranged inside the hollow shaft 12 behind the bit receptacle 13. The electromagnet 11 can be excited though the supply line 15. Excitation of the electromagnet 11 gives rise to a magnetic flow concentrated on the longitudinal axis of the hollow shaft 12, so that the screwdriver bit 2 is axially magnetisable.

In the second sample embodiment of FIG. 1*b*, the electromagnet 11 features the anchor 11*a*, wherein the screwdriver bit 2 can be made to vibrate by means of the anchor 11*a*. The maximum stroke of the anchor 11*a* is measured in such a way that when it is correspondingly excited by the electromagnet 11 it hits the back of the screwdriver bit 2. Excitation of the electromagnet 11 by means of an alternating voltage thus generates a periodic tapping of the anchor 11*a* against the back of the screwdriver bit 2.

In the third sample embodiment of FIG. 1*c*, the separate vibration inducer 14 is integrated in the bit holder 1 instead of an anchor of this kind, where the vibration inducer 14 is fashioned as a piezoelectric actor that likewise can be actuated electrically via the supply line 15 and is designed to induce vibration of the bit receptacle 13 and thus of the screwdriver bit 2.

Figure 2:
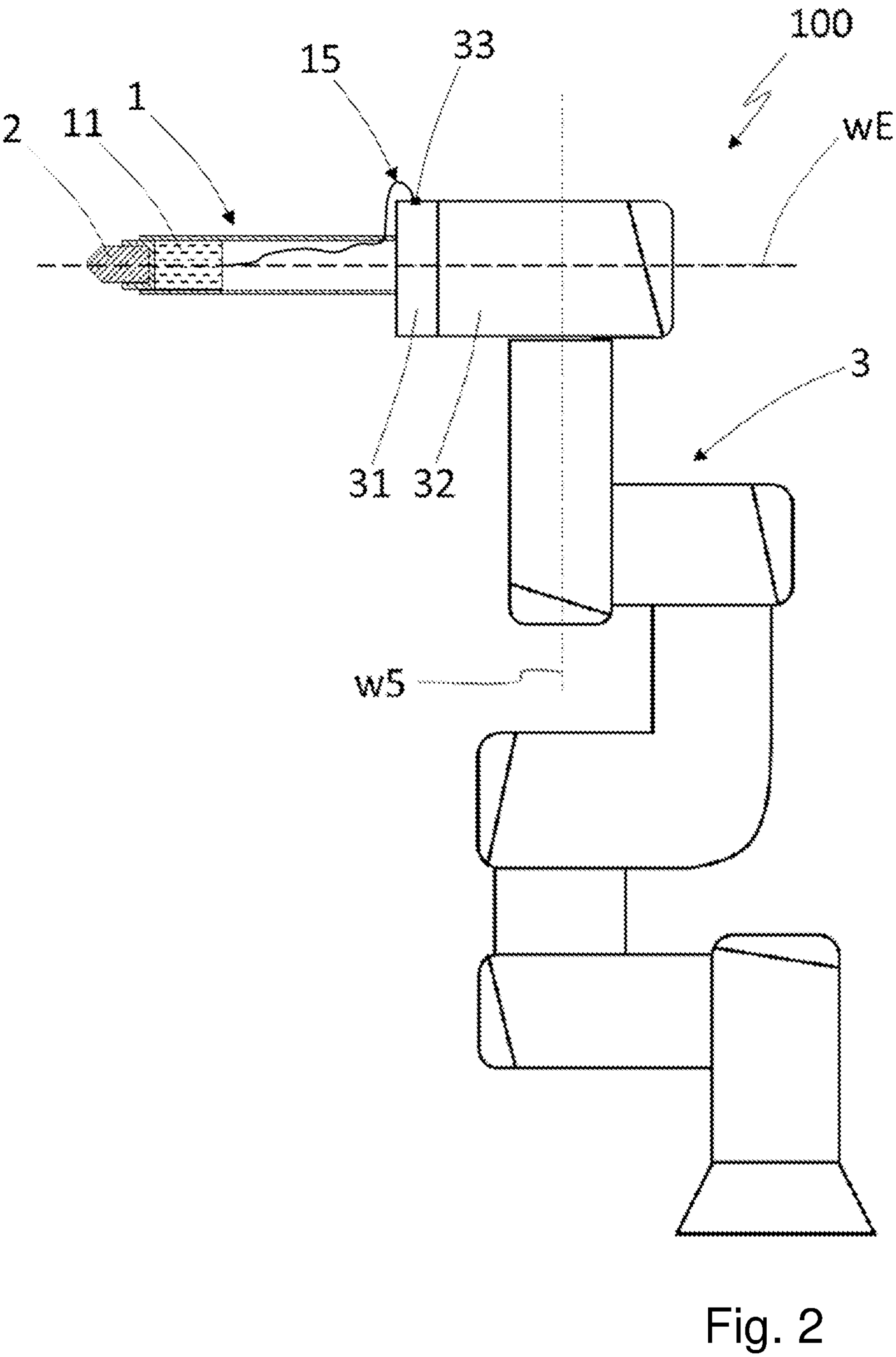
FIG. 2 is a part cross-section view of an inventive device.

FIG. 2 shows a part cross-section view of an inventive device 100 for the automated manufacture of screw connections, comprising the jointed arm robot 3 with the output element 31 rotatable around the effector axis wE against the end link 32. In the present case, the jointed arm robot 3 is designed as a six-axis robot, wherein the fifth rotary axis w5 is marked and the effector axis wE corresponds to the sixth rotary axis of the jointed arm robot 3. The device 100 furthermore comprises the inventive bit holder 1 that is accommodated on the output element 31 and is rotatable around the effector axis wE by means of the output element 31. The supply line 15 for exciting the electromagnet 11 is connected to the port 33, which is connected for example to the electric power supply of the jointed arm robot 3 via sliding contacts.

The invention is not limited in its embodiment to the preferred sample embodiment specified above. Rather, a number of variants are conceivable, which also make use of embodiments of a principally different nature from the solution shown. All features and/or advantages arising from the claims, the description or the drawings, including design details and spatial arrangements, can be material to the invention both in themselves and in the widest range possible of combinations.

LIST OF REFERENCE NUMBERS

100 Device
1 Bit holder
11 Electromagnet
12 Hollow shaft
13 Bit receptacle
14 Vibration inducer
2 Screwdriver bit
3 Jointed arm robot
31 Drive element
32 End link
33 Port
wE Effector axis
w5 Fifth rotary axis

We claim:

1. A bit holder for a magnetisable screwdriver bit, the bit holder comprising:
an electromagnet for magnetising the screwdriver bit;
a hollow shaft with a bit receptacle at an end of the hollow shaft for fastening the screwdriver bit,
wherein the electromagnet is arranged inside the hollow shaft behind the bit receptacle, and
wherein the electromagnet includes an anchor, the anchor causing the bit receptacle and/or the screwdriver bit to vibrate.

2. A device for the automated manufacture of screw connections, the device comprising:
a jointed arm robot with an output element rotatable around an effector axis (wE), and
a bit holder according to claim 1, wherein the bit holder is accommodated at least indirectly on the output element and is rotatable around the effector axis (wE) by the output element.

3. A procedure for operating the device for the automated manufacture of screw connections according to claim 2, at least comprising the following procedural steps:
arranging a magnetisable screwdriver bit on the bit holder,
magnetising the screwdriver bit via the electromagnet,
accommodating a magnetisable screw on the screwdriver bit, and
manufacturing a screw connection via the screw.

4. The procedure in accordance with claim 3, wherein the screwdriver bit is cleaned of adhering metal chips after the manufacture of a number of screw connections, wherein the screwdriver bit and/or the metal chips are demagnetised by the electromagnet.

5. The procedure in accordance with claim 4, wherein the screwdriver bit is vibrated by an anchor of the electromagnet or by a vibration inducer during demagnetisation and/or following demagnetisation.

6. A bit holder for a magnetisable screwdriver bit, the bit holder comprising:
an electromagnet for magnetising the screwdriver bit; and
a hollow shaft with a bit receptacle at an end of the hollow shaft for fastening the screwdriver bit,
wherein the electromagnet is arranged inside the hollow shaft behind the bit receptacle, and
wherein the bit holder includes a vibration inducer causing the bit receptacle and/or the screwdriver bit to vibrate.

* * * * *